(12) United States Patent
Glazer (10) Patent No.: US 9,503,852 B2
(45) Date of Patent: Nov. 22, 2016

(54) APPARATUS AND METHOD OF SURVEILLANCE

(71) Applicant: Yariv Glazer, Be'er Tuvia (IL)

(72) Inventor: Yariv Glazer, Be'er Tuvia (IL)

( * ) Notice: Subject to any disclaimer, the term of this patent is extended or adjusted under 35 U.S.C. 154(b) by 394 days.

(21) Appl. No.: 14/302,357

(22) Filed: Jun. 11, 2014

(65) Prior Publication Data

US 2015/0365633 A1 Dec. 17, 2015

(51) Int. Cl.
*H04N 7/18* (2006.01)
*H04W 4/02* (2009.01)
*H04H 20/59* (2008.01)
*H04W 4/22* (2009.01)

(52) U.S. Cl.
CPC ........... *H04W 4/023* (2013.01); *H04H 20/59* (2013.01); *H04N 7/18* (2013.01); *H04W 4/22* (2013.01)

(58) Field of Classification Search
CPC ........ H04W 4/023; H04W 4/22; H04N 7/18; H04H 20/59

USPC ........................................................ 348/143
See application file for complete search history.

(56) References Cited

U.S. PATENT DOCUMENTS

| | | | |
|---|---|---|---|
| 2010/0245582 A1* | 9/2010 | Harel | G08B 13/1672 348/159 |
| 2013/0183924 A1* | 7/2013 | Saigh | H04W 4/025 455/404.2 |

* cited by examiner

*Primary Examiner* — Allen Wong (57) ABSTRACT

Surveillance apparatus and method include a surveillance processor; a requestor terminal communicating with the surveillance processor for requesting information regarding a particular site of an object; a plurality of responder terminals; and a location processor for determining the locations of the responder terminals with respect to the particular site. The novelty is characterized in that the apparatus and method further include a media processor for relaying messages regarding the particular site to the responder terminals; and in that the information requested by the requestor terminal from the surveillance processor includes the locations of the responder terminals to be stored when located, by the location processor, within a specified distance from the particular site.

20 Claims, 6 Drawing Sheets

APPARATUS AND METHOD OF SURVEILLANCE

This application is a continuation application of U.S. Provisional Application No. 61/830,750, filed Jun. 4, 2013, and incorporates by reference the disclosure therein.

FIELD AND BACKGROUND OF THE INVENTION

The present invention relates to an apparatus and to a method of surveillance, and particularly to such apparatus and method useful with mobile devices.

Networks users are located throughout the globe and carry mobile devices with photographic capabilities. Many users would like to view, at certain times, a specific remote location, such as a restaurant, a storefront, or even a product on a particular store shelf. For example, a network user may wish to have the ability of viewing a normally crowed place such as a restaurant in order to consider postponing a visit, or of initiating an early AMBER alert for a lost person, or of viewing a particular piece of real estate. Other examples include the ability of meeting a dating prospect, or of initiating an early capture of evidence of a crime or of an explosion. The network user may further wish to do one or more of the above anonymously.

It would be highly desirable to provide network users with one or more of such abilities.

OBJECTS AND BRIEF SUMMARY OF THE PRESENT INVENTION

An object of the present invention is to provide an apparatus and a method of surveillance having advantages in one or more of the above respects.

According to one broad aspect of the present invention, there is provided surveillance apparatus, comprising: a surveillance processor; a requestor terminal communicating with the surveillance processor for requesting information regarding a particular site of an object; a plurality of responder terminals; and at least one location processor for determining the location of each responder terminal with respect to the particular site; characterized in that the apparatus further comprises at least one media processor for relaying messages regarding the particular site to each responder terminal; and in that the information requested by the requestor terminal from the surveillance processor includes the locations of each responder terminal to be stored when located, by the location processor, within a specified distance from the particular site of the object.

According to another broad aspect, the invention provides a method of surveillance, comprising: providing a surveillance processor; providing a requestor terminal communicating with the surveillance processor for requesting information regarding a particular site of an object; providing a plurality of responder terminals; and providing at least one location processor for determining the locations of each responder terminals with respect to the particular site; characterized in that the method further comprises providing at least one media processor for relaying messages regarding the particular site to each responder terminal; and in that the information requested by the requestor terminal from the surveillance processor includes the locations of each responder terminal to be stored when located, by the location processor, within a specified distance from the particular site of the object.

Some described embodiments include a plurality of requestor terminals in communication with the surveillance processor. In one described embodiment, one of the requestor terminals communicates with the surveillance processor for requesting the information, and another of the requestor terminals displays the requested information. In another described embodiment, the same requestor terminal both requests and displays the requested information. The messages may be requests for visual information regarding the particular site.

Other embodiments are described wherein the locations of the responder terminals to be stored are their locations at the time the request is made by the requestor terminal. Further embodiments are described wherein the messages are relayed at the time the responder terminals are located by the location processor as being within the specified distance from the particular site.

Still further embodiments are described wherein: the particular site is the location of the requestor terminal; the apparatus further comprises an Anonymization processor for anonymizing the identity of the requestor terminal and/or of the responder terminal; the plurality of responder terminals are mobile terminals; the plurality of requestor terminals are mobile responder terminals; and the media processor also relays messages from said responder terminal to said requestor terminal.

The invention is particularly useful to enable a user of the network to request a picture of a remote object, such as a storefront. In such an application, the location processor locates user(s) within a specified distance from the storefront; the anonymization processor relays the request anonymously to the located users; the responder users photograph the remote object; and the anonymization processor relays the photograph anonymously to the requestor user.

The invention is also useful for users intending to visit a normally crowded place, such as a restaurant, a park, or a gym. In such an application, the invention provides users with the ability to request anonymously a current photo of such a place in order to decide whether to postpone the visit to that place.

Another application of the invention is to enable early initiation of searches for lost persons, especially wandering children, thereby avoiding the need for an AMBER alert. In such an application, a timely and localized broadcast is provided to network users in the relevant vicinity of the lost person, for locating the lost person. Thus, the time and area involved in the search for the lost person are minimized, and network users in the immediate vicinity are utilized for locating such a lost person.

The invention is particularly advantageous with respect to mentally challenged persons who may be incapable of aiding their caretakers when separated therefrom, in that the invention enables caretakers to request network users in the immediate vicinity to look for, and to photograph, people whose description matches such a person.

The invention is also particularly useful for prospective buyers of real estate. Visual resources of a remote property are frequently limited and presented in a manner to benefit the seller. This situation creates the need for buyers to actually visit the property and its vicinity. Such need is eliminated by the invention.

The invention may also be used by persons for meeting dating prospects. It may further be used by security agencies for enabling them to alert persons in the vicinity of a crime, of an explosion, or of other terrorist activity, to capture visual evidence, such as of people or objects, in the immediate vicinity of the respective person.

BRIEF DESCRIPTION OF THE DRAWINGS

The invention is herein described, by way of example only, with reference to the accompanied drawings, wherein.

It is to be understood that the forgoing drawings, and the description below, are provided primarily for purposes of facilitating understanding the conceptual aspects of the invention and possible embodiments thereof, including what is considered to be a preferred embodiment. In the interest of clarity and brevity, no attempt is made to provide more details then necessary to enable one skilled in the art, using routine skill and design, to understand and practice the described invention. It is to be further understood that the embodiments described are for a purposes of example only, and that the invention is capable of been embodied in other forms and applications than described herein.

DESCRIPTION OF PREFERRED EMBODIMENTS

Figure 1:
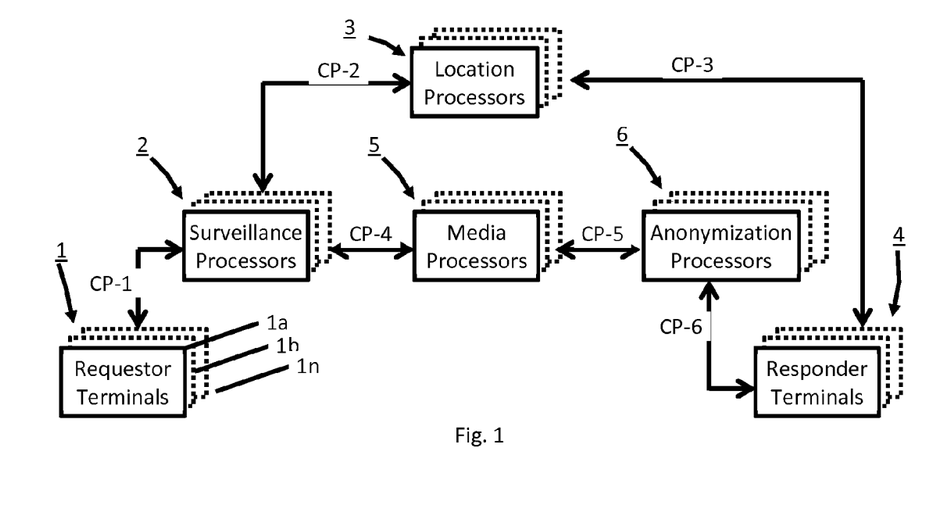
FIG. 1 is a block diagram of an overall system constructed in accordance with the present invention.

As indicated earlier, the invention involves a method and apparatus utilizing network users for surveillance applications. FIG. 1 is a block diagram of an overall system constructed in accordance with the present invention, and FIGS. 2-6 are schematic flow diagrams of five preferred embodiments of the invention.

As schematically shown in FIG. 1, the system includes a plurality of requestor terminals 1, communicating with a plurality of surveillance processors 2 via a communication path CP-1. The surveillance processors 2 communicate with a plurality of location processors 3 via a communication path CP-2. The system further includes a plurality of responder terminals 4, a plurality of media processors 5, and a plurality of anonymization processors 6. The surveillance processors 2 communicate with the media processors 5 via a communication path CP-4; the media processors 5 communicate with the plurality of anonymization processors 6 via a communication path CP-5; and the anonymization processors 6 communicate with the plurality of responder terminals 4 via a communication path CP-6.

Figure 2:
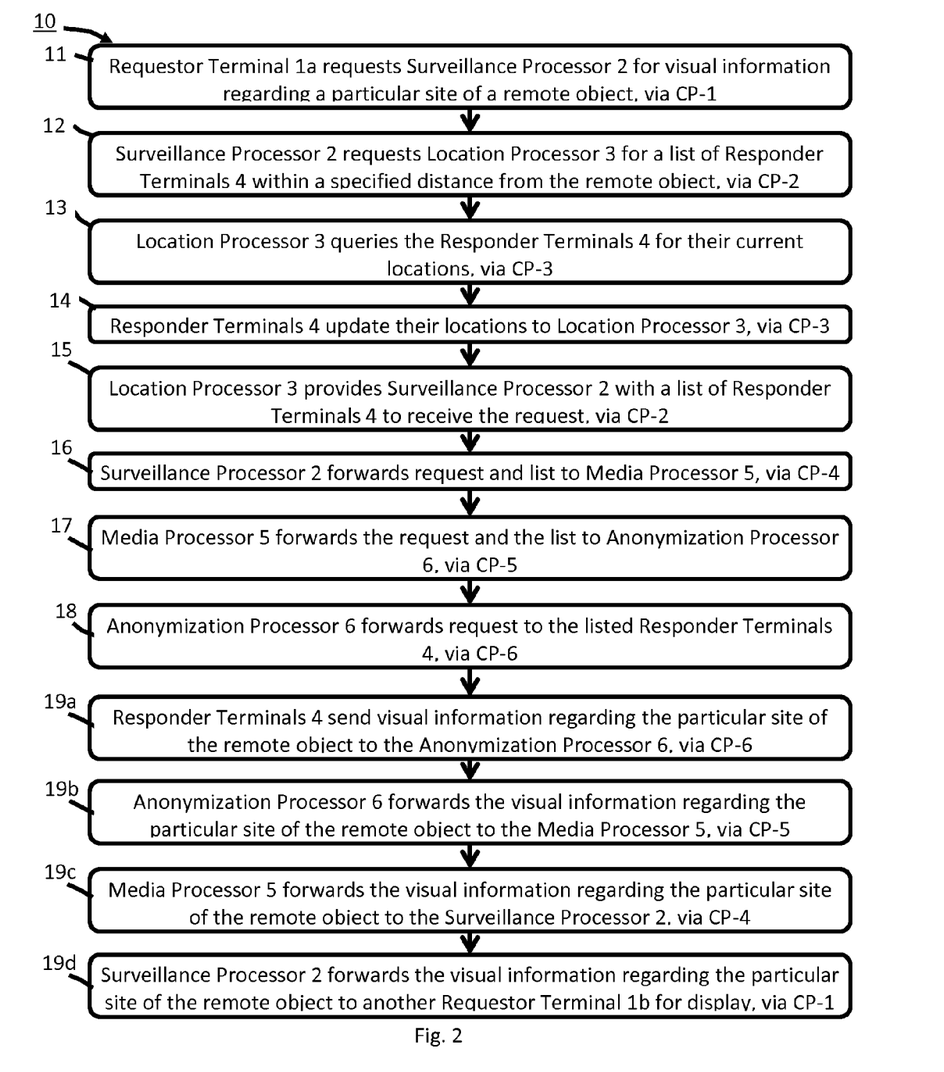
FIGS. 2-6 are schematic flow diagrams of five embodiments of the invention.

The flow diagram in FIG. 2 schematically illustrates one embodiment of the invention generally designated 10. In FIG. 2, a Requestor Terminal 1a (of a plurality of Requestor Terminals 1) sends, via communication path CP-1, a request to a Surveillance Processor 2 for visual information regarding a remote object (operation 11); and the Surveillance Processor 2 requests, via communication path CP-2, a Location Processor 3 for a list of Responder Terminals 4 within a specified distance from the remote object (operation 12). The Location Processor 3 queries, via communication path CP-3, Responder Terminals 4 within a specified distance from the remote object for their current locations (operation 13); and Responder Terminals 4 update, via communication path CP-3, their locations to the Location Processor 3 (operation 14).

The Location Processor 3 provides, via communication path CP-2, Surveillance Processor 2 with a list of Responder Terminals 4 to receive the request (operation 15); and the Surveillance Processor 2 forwards, via communication path CP-4, the request and the list to a Media Processor 5 (operation 16). The Media Processor 5 forwards, via communication path CP-5, the request and the list to an Anonymization Processor 6 (operation 17); and the Anonymization Processor 6 forwards, via communication path CP-6, the request to the listed Responder Terminals 4 (operation 18).

The Responder Terminals 4 send, via communication path CP-6, the requested visual information regarding the particular site to the Anonymization Processor 6 (operation 19a); and the Anonymization Processor 6 forwards, via communication path CP-5, the visual information regarding the remote object to the Media Processor 5 (operation 19b). The Media Processor 5 then forwards, via communication path CP-4, the visual information regarding the particular site of the remote object to the Surveillance Processor 2 (operation 19c). The Surveillance Processor 2 forwards, via communication path CP-1, the visual information regarding the remote object to another Requestor Terminal 1b for display (operation 19d).

Figure 3:
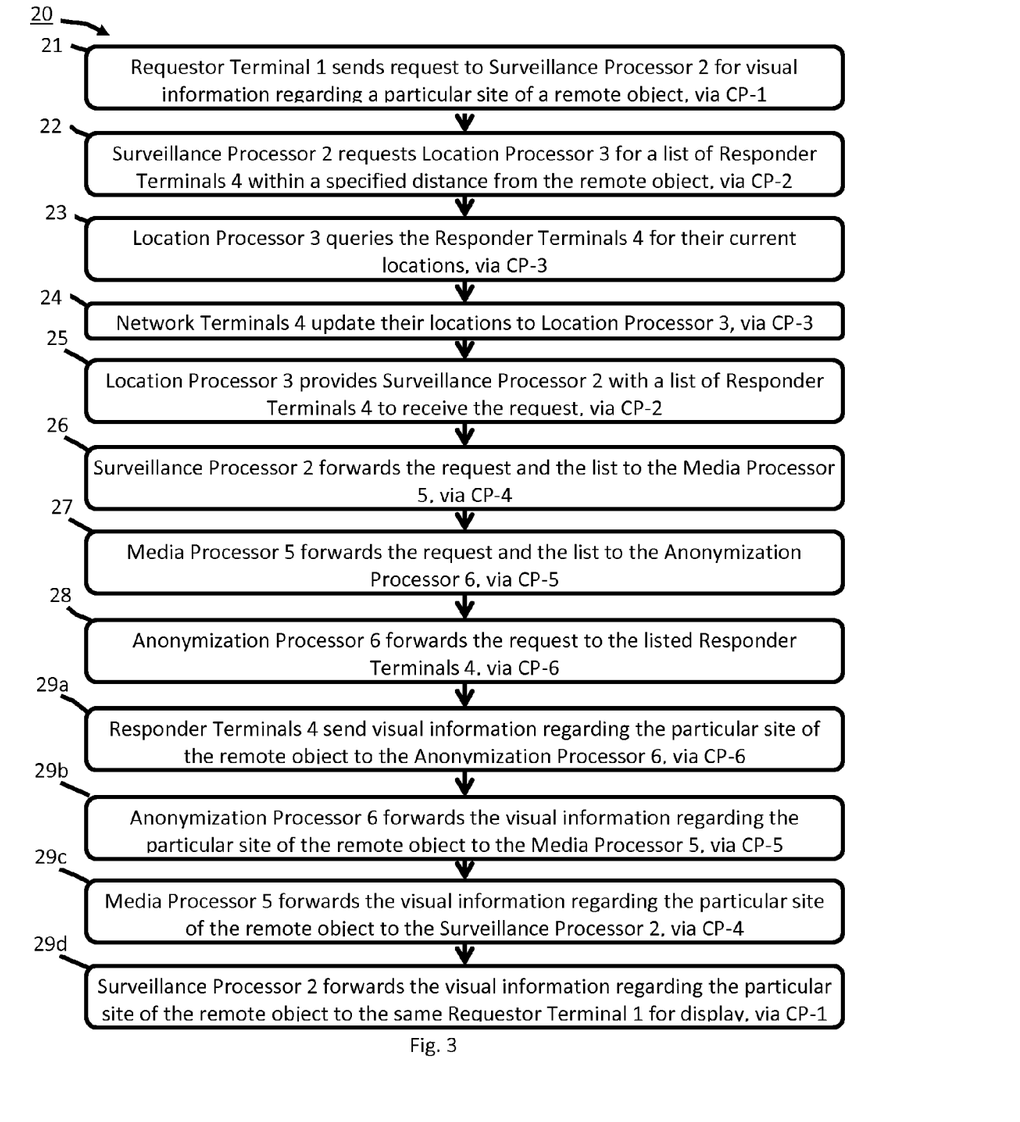

The flow diagram in FIG. 3 schematically illustrates a second embodiment of the invention generally designate 20. This embodiment is similar to that of FIG. 2 except that, whereas in FIG. 2 the request to the surveillance processor 2 for information regarding a particular site of a remote object in made by one requestor terminal 1a and the response is displayed in another requestor terminal 1b, in FIG. 3 both the request is made, and the response is displayed, in the same requestor terminal 1. Operations 21 and 29d are appropriately modified to show the forgoing differences in the embodiment of FIG. 3. The remaining operations in FIG. 3 (namely operations 22-29c) are the same as the corresponding operations 12-19c, respectively, in FIG. 2.

In the embodiments of FIGS. 2 and 3, a user of the network may thus request a picture of a remote object, such as a storefront. When such a request is made, the location processor locates user(s) within a specified distance from the storefront; the anonymization processor relays the request anonymously to the located users; the responder users photograph the remote object; and the anonymization processor relays the photograph anonymously to the requestor user.

As noted above, these embodiments of the invention are particularly useful for users intending to visit a frequently crowded place, such as a restaurant, a park, or a gym, in that they provide users with the ability to request anonymously a current photo of such a place in order to decide whether or not to postpone the visit to that place.

As further noted above, the embodiments of FIGS. 2 and 3 are also particularly useful for users to enable early initiation of searches for lost persons, especially wandering children, thereby avoiding the need for an AMBER Alert. These embodiments thus provide a timely and localized broadcast to network users in the relevant vicinity of the lost person for locating the lost person. Thus, these embodiments minimize the time and area involved in the search for the lost person, and utilize network users in the immediate vicinity for locating such a lost person. These embodiments are particularly useful with respect to mentally challenged persons who may be incapable of aiding their caretakers when separated therefrom, in that they enable caretakers to request network users in the immediate vicinity to look for, and to photograph, people whose description matches such a lost person.

As still further noted above, the invention is also particularly useful for prospective buyers of real estate. Visual resources of a remote property frequently are limited and presented in a manner to benefit the seller. Such a situation creates the need for buyers to visit the property and its vicinity, which need is eliminated by these embodiments of the invention.

Figure 4:
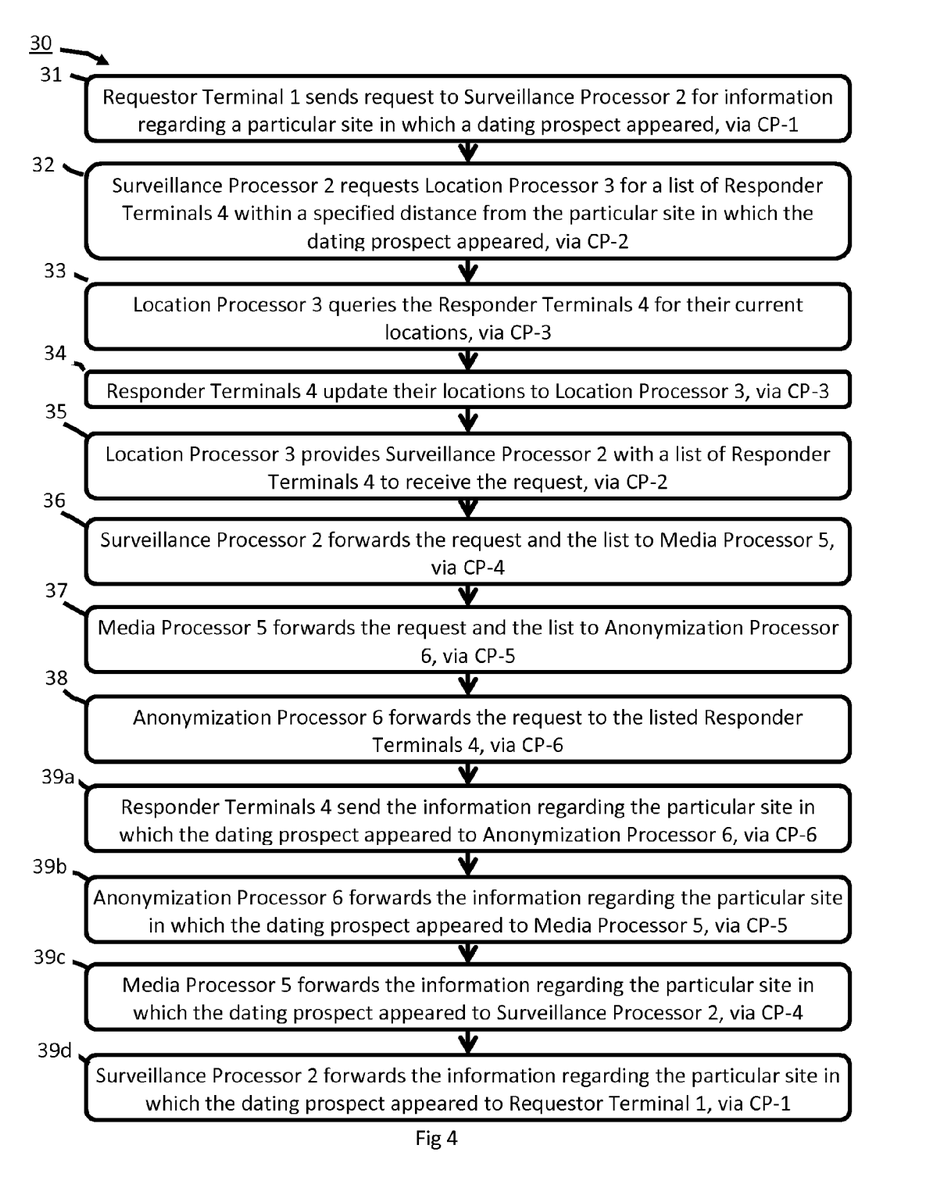

The flow diagram generally designated 30 in FIG. 4 schematically illustrates a third embodiment of the invention. This embodiment is particularly useful for meeting dating prospects.

Thus, as schematically illustrated in operation 31, a Requestor Terminal 1 sends, via CP-1, a request to the Surveillance Processor 2 to supply information regarding a particular site in which a dating prospect appeared. The Surveillance Processor 2 then requests, via CP-2, the Location Processor 3 to supply a list of Responder Terminals 4 within a specified distance from the particular site in which the dating prospect appeared, (operation 32). The Location Processor 3 then queries, via CP-3, Responder Terminals 4 for their current locations (operation 33). Responder Terminals 4 then update, via CP-3, their locations to the Location Processor 3 (operation 34). The Location Processor 3 then provides, via CP-2, the Surveillance Processor 2 with a list of Responder Terminals 4 to receive the request (operation 35). The Surveillance Processor 2 then forwards, via CP-4, the request and the list to the Media Processor 5 (operation 36). The Media Processor 5 then forwards, via CP-5, the request and the list to the Anonymization Processor 6 (operation 37). The Anonymization Processor 6 then forwards, via CP-6, the request to the listed Responder Terminals 4 (operation 38). The Responder Terminals 4 then send to the Anonymization Processor 6, via CP-6, the information regarding the particular site in which the dating prospect appeared (operation 39*a*). The Anonymization Processor 6 then forwards to the Media Processor 5, via CP-5, the information regarding the particular site in which the dating prospect appeared (operation 39*b*). The Media Processor 5 then forwards to the Surveillance Processor 2, via CP-4, the information regarding the particular site in which the dating prospect appeared (operation 39*c*). Finally, the Surveillance Processor 2 forwards to the Requestor Terminal 1, via CP-1, the information regarding the particular site in which the dating prospect appeared (operation 39*d*).

As also noted above, these embodiments are particularly useful for security agencies in that they enable such agencies to alert network users, in the vicinity of a crime, an explosion, or other terrorist activity, to capture visual evidence. Such visual evidence may be of people or objects in the immediate vicinity of the respective network user, and thereby of the respective site.

Figure 5:
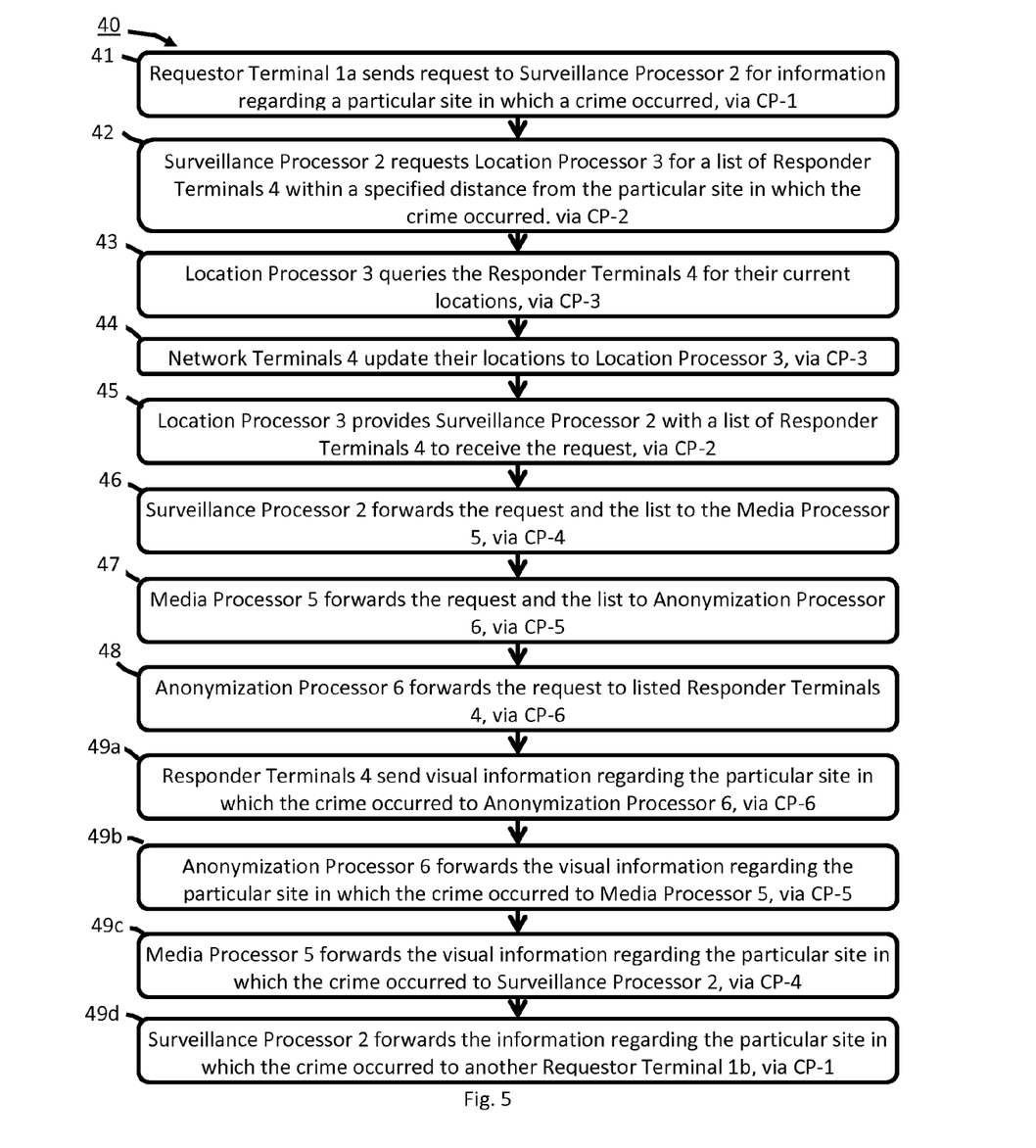

The flow diagram generally designated 40 in FIG. 5 schematically illustrates a forth embodiment of the invention. This embodiment is particularly useful for obtaining information regarding a particular site in which a crime occurred in order to alert network users at the respective site regarding the occurrence of the crime.

Thus, as schematically illustrate in FIG. 5, upon hearing that a crime has occurred, a Requestor Terminal 1*a* sends, via CP-1, a request to the Surveillance Processor 2 for information regarding a particular site in which the crime occurred (operation 41). Surveillance Processor 2 makes a request from the Location Processor 3, via CP-2, for a list of Responder Terminals 4 within a specified distance from the particular site in which the crime occurred (operation 42). Location Processor 3 queries, via CP-3, the Responder Terminals 4 to provide their current locations (operation 43). Each Responder Terminal 4 updates its location in the Location Processor 3, via CP-3 (operation 44).

The Location Processor 3 provides, via CP-2, the Surveillance Processor 2 with a list of Responder Terminals 4 to receive the request (operation 45). The Surveillance Processor 2 then forwards, via CP-4, the request and the list to the Media Processor 5 (operation 46). The Media Processor 5 then forwards, via CP-5, the request and the list to the Anonymization Processor 6 (operation 47). The Anonymization Processor 6 then forwards, via CP-6, the request to each of the listed Responder Terminals 4 (operation 48). The Responder Terminals 4 then send, via CP-6, to the Anonymization Processor 6 visual information regarding the particular site in which the crime occurred (operation 49*a*). The Anonymization Processor 6 then forwards, via CP-5, the visual information regarding the particular site in which the crime occurred to the Media Processor 5 (operation 49*b*). The Media Processor 5 then forwards, via CP-4, the visual information regarding the particular site in which the crime occurred to the Surveillance Processor 2 (operation 49*c*). The Surveillance Processor 2 then forwards, via CP-1, the information regarding the particular site in which the crime occurred to another Requestor Terminal 1*b* (operation 49*d*).

Figure 6:
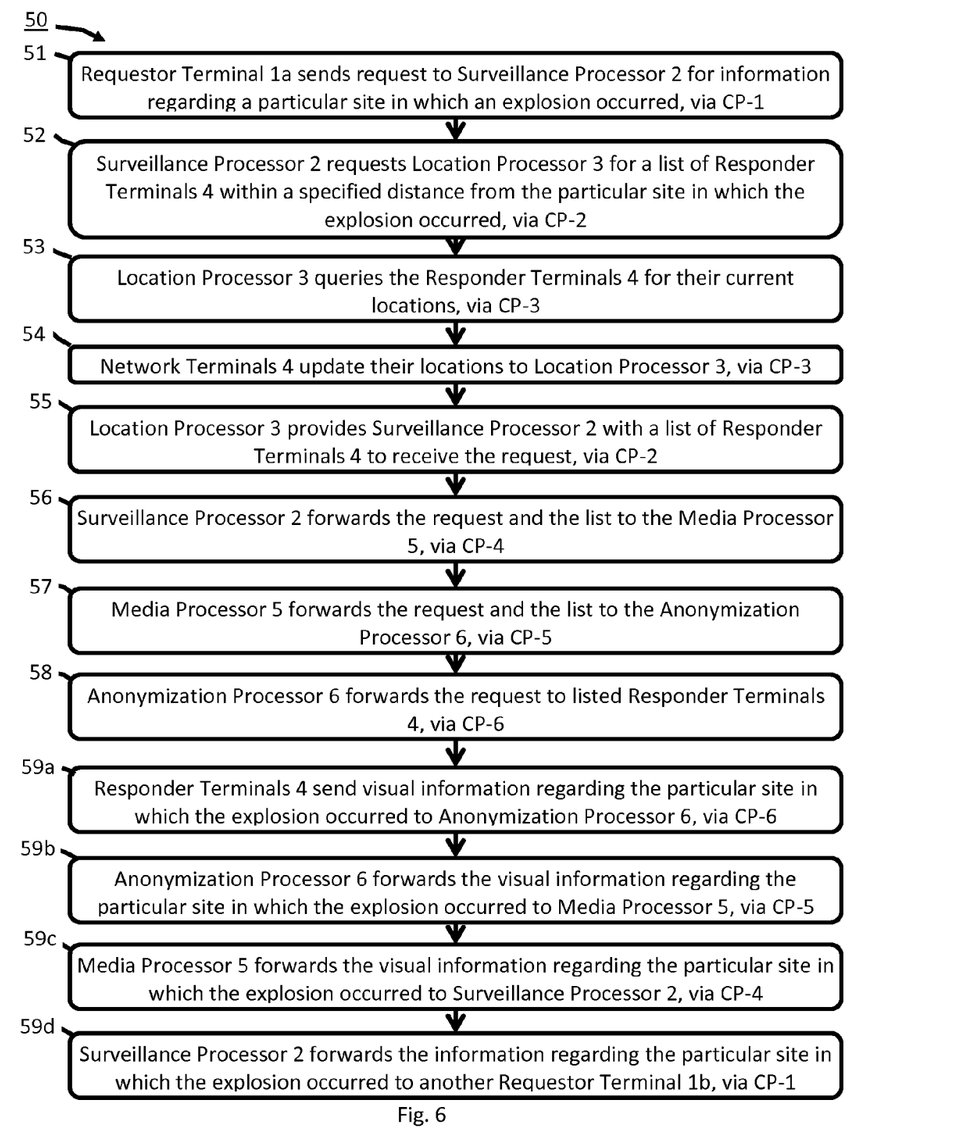

The flow diagram generally designated 50 in FIG. 6 schematically illustrates a fifth embodiment of the invention. This embodiment is similar to that of FIG. 5 except that it is particularly useful for obtaining information regarding a particular site in which an explosion or other terrorist activity occurred.

Thus, as schematically illustrated in FIG. 6, upon hearing that an explosion occurred, a Requestor Terminal 1*a* sends, via CP-1, a request to the Surveillance Processor 2 for information regarding a particular site in which the explosion occurred (operation 51). The Surveillance Processor 2 requests from the Location Processor 3, via CP-2, a list of Responder Terminals 4 within a specified distance from the particular site in which the explosion occurred (operation 52).

The Location Processor 3 queries, via CP-3, each of the Responder Terminal 4 in the list for its current location (operation 53). The Network Terminals 4 then update, via CP-3, their locations to the Location Processor 3 (operation 54). The Location Processor 3 then provides, via CP-2, the Surveillance Processor 2 with an updated list of Responder Terminals 4 to receive the request (operation 55). The Surveillance Processor 2 forwards, via CP-4, the request and the list to the Media Processor 5 (operation 56). The Media Processor 5 then forwards the request and the list, via CP-5, to the Anonymization Processor 6 (operation 57).

The Anonymization Processor 6 then forwards, via CP-6, the request to each of the listed Responder Terminals 4 (operation 58). Each of the Responder Terminals 4 then sends to the Anonymization Processor 6, via CP-6, visual information regarding the particular site in which the explosion occurred (operation 59*a*). The Anonymization Processor 6 then forwards to the Media Processor 5, via CP-5, the visual information regarding the particular site in which the explosion occurred (operation 59*b*). The Media Processor 5 then forwards to the Surveillance Processor 2, via CP-4, the visual information regarding the particular site in which the explosion occurred (operation 59*c*). Finally, the Surveillance Processor 2 forwards via CP-1 to another Requestor Terminal 1*b* the information regarding the particular site in which the explosion occurred (operation 59*d*).

It will thus be seen that, while the invention has been described with respect to a number of embodiments, these are set forth merely for purposes of example, and that many other variations, modifications, and applications of the invention may be made.

What is claimed is:

1. Surveillance apparatus, comprising:
a surveillance processor;
a requestor terminal communicating with said surveillance processor for requesting information regarding a particular site of an object;
a plurality of responder terminals; and
a location processor for determining the locations of said responder terminals with respect to said particular site;
characterized in that said apparatus further comprises a media processor for relaying messages regarding said particular site to said responder terminals; and in that the information requested by said requestor terminal from said surveillance processor includes the locations of said responder terminals to be stored when located, by said location processor, within a specified distance from said particular site.

2. The apparatus according to claim 1, wherein there are a plurality of requestor terminals in communication with said surveillance processor.

3. The apparatus according to claim 2, wherein one of said requestor terminals communicates with said surveillance processor for requesting said information, and another of said requestor terminals displays said requested information.

4. The apparatus according to claim 2, wherein the same requestor terminal both requests and displays said requested information.

5. The apparatus according to claim 2, wherein said messages are requests for visual information regarding said particular site.

6. The apparatus according to claim 1, wherein the locations of said responder terminals to be stored are their locations at the time the request is made by said requestor terminal.

7. The apparatus according to claim 1, wherein said messages are relayed at the time said responder terminals are located, by said location processor, within said specified distance from the particular site.

8. The apparatus according to claim 1, wherein said particular site is the location of said requestor terminal.

9. The apparatus according to claim 1, wherein said apparatus further comprises an Anonymization processor for anonymizing the identity of the requestor terminal.

10. The apparatus according to claim 1, wherein said apparatus further comprises an Anonymization processor for anonymizing the identity of the responder terminals.

11. The apparatus according to claim 1, wherein said plurality of responder terminals are mobile terminals.

12. The apparatus according to claim 11, wherein there are a plurality of mobile requestor terminals in communication with said surveillance processor.

13. The apparatus according to claim 12, wherein said media processor also relays messages from said mobile responder terminals to said mobile requestor terminals.

14. Surveillance apparatus, comprising:
a surveillance processor;
a requestor terminal communicating with said surveillance processor for requesting information regarding a particular site of an object;
a plurality of responder terminals; and
a location processor for determining the locations of said responder terminals with respect to said particular site;
characterized in that said apparatus further comprises a media processor for relaying messages regarding said particular site to said responder terminals; in that the information requested by said requestor terminal from said surveillance processor includes the locations of said responder terminals to be stored when located, by said location processor, within a specified distance from said particular site; and in that said media processor also relays messages from said responder terminals to said requestor terminal.

15. The apparatus according to claim 14, wherein there are a plurality of requestor terminals in communication with said surveillance processor.

16. The apparatus according to claim 15, wherein one of said requestor terminals communicates with said surveillance processor for requesting said information, and another of said requestor terminals displays said requested information.

17. The apparatus according to claim 15, wherein the same requestor terminal both requests and displays said requested information.

18. The apparatus according to claim 14, wherein the locations of said responder terminals to be stored are their locations at the time the request is made by said requestor terminal.

19. The apparatus according to claim 14, wherein said messages are relayed at the time said responder terminals are located, by said location processor, within said specified distance from the particular site.

20. A method of surveillance, comprising:
providing a surveillance processor;
providing a requestor terminal communicating with said surveillance processor for requesting information regarding a particular site of an object;
providing a plurality of responder terminals; and
providing a location processor for determining the locations of said responder terminals with respect to said particular site;
characterized in that said method further comprises providing a media processor for relaying messages regarding said particular site to said responder terminals; and in that the information requested by said requestor terminal from said surveillance processor includes the locations of said responder terminals to be stored when located, by said location processor, within a specified distance from said particular site.

* * * * *